United States Patent Office 3,782,927
Patented Jan. 1, 1974

3,782,927
MATERIAL FOR DIRECT THERMOELECTRIC ENERGY CONVERSION WITH A HIGH FIGURE OF MERIT
Michael C. Nicolaou, Toronto, Ontario, Canada (Universidad Industrial de Santander, Bucaramanga, Colombia)
No Drawing. Filed Aug. 24, 1971, Ser. No. 174,531
Int. Cl. C22c 23/00, 31/00; H01v 1/16
U.S. Cl. 75—134 B
25 Claims

ABSTRACT OF THE DISCLOSURE

In devices used hitherto for the direct conversion of heat into electricity, commonly known as "thermoelectric energy converters," the efficiency of conversion is appreciably lower than that of conventional reciprocating or rotary heat engines. The basic reason for this low efficiency is inherent in the physical properties of the materials selected for the manufacture of these devices. The materials that have been and are currently being used for this purpose are intermetallic compounds and alloys of silicon and germanium. In this invention an entirely new material is developed. It is composed of an alloy or solid solution of the three intermetallic compounds: magnesium stannide, magnesium germanide and magnesium silicide, and defined by the chemical formula: $Mg_2Si_xGe_ySn_{1-x-y}$. This material, when properly doped, possesses a figure of merit and, consequently, an efficiency of direct conversion of thermal energy into electrical energy far exceeding that of any other material previously known or used.

---

An application for patent for the same invention described and claimed in the present specification and claims has been previously filed in Canada. The details of filing the prior application are as follows:

Application serial No.: 101,889
Filing date: Jan. 4, 1971
Applicant: Michael C. Nicolaou
Title: Material for Direct Thermoelectric Energy Conversion With a High Figure of Merit This invention relates to a new material for direct thermoelectric energy conversion. This invention also relates to a process for producing the material and to a device for effecting direct thermoelectric energy conversion, comprising such a material. The material is composed of an alloy or solid solution of the following three intermetallic compounds:

magnesium stannide, $Mg_2Sn$,
magnesium germanide, $Mg_2Ge$ and
magnesium silicide, $Mg_2Si$ The alloy or solid solution is defined by the chemical formula: $Mg_2Si_xGe_ySn_{1-x-y}$ where $x$ and $y$ represent the molecular proportion of each of magnesium silicide and magnesium germanide in the alloy, respectively. The alloy or solid solution also contains one or more additional p-type or n-type doping materials.

Technological development continuously depends on establishing or discovering new techniques and methods for conversion of energy from one form to another. The basic method used up till now involves the conversion of the energy stored in a fossil or nuclear fuel into heat, converting the heat energy into mechanical energy in a reciprocating engine (Diesel or gasoline) or a rotary engine (steam or gas turbine), and then finally converting the mechanical energy into electrical energy via an electric generator or alternator. This is well known as the conventional technique of energy conversion. The overall conversion efficiency that is realized with this method in practice ranges from 30 to 40%.

In the past one or two decades, an intensive research effort has been going on in the large industrial countries aiming at the development of new techniques for energy conversion. In these techniques, the reciprocating engine or turbine as well in the electric generator are dispensed with and the conversion of energy is carried out with the aid of solid state devices. These techniques employ various physical principles or phenomena and are generally labeled: "direct energy conversion." One of these methods is that which utilizes the thermoelectric properties of materials, namely the Seebeck and Peltier effects. This is, therefore, called direct thermoelectric energy conversion.

In its simplest form, a thermoelectric energy converter is basically composed of a hot junction, a cold junction, a positive branch and a negative branch. The hot junction is usually a metallic plate attached to one end of each branch and must be a good conductor of both heat and electricity. The electric load is normally connected to the other end of each branch and thus forms the cold junction of the device. The hot junction is brought into contact with the source of thermal energy. Now the difference in temperature between the hot and cold junctions creates a voltage difference and a flow of electrons from one branch to the other. The electric energy thus developed is utilized by the electric load. The efficiency of energy conversion of such a device depends basically on:

(1) The temperature difference between the hot and cold junctions
(2) The physical properties of the materials used for the manufacture of the positive and negative branches of the device.

The suitability of any material for thermoelectric energy conversion is examined by means of a parameter called the "thermoelectric figure of merit Z." The figure of merit is:

$$Z = S^2\sigma/k$$

where $S$ = the Seebeck coefficient or thermoelectric power
$\sigma$ = the electrical conductivity
$k$ = the thermal conductivity Thus, the efficiency of a thermoelectric device is governed by the second law of thermodynamics and the figure of merit.

Up to the present time, several materials have been and are being continuously developed for this purpose. They fall within the category of materials generally known as semiconductors and are either simple metallic elements or alloys thereof, such as silicon and germanium, or intermetallic compounds. Of the latter class, mention may be made of bismuth telluride, antimony telluride, lead telluride, antimony silver telluride, lead selenide, bismuth selenide etc., as well as mixtures or solid solutions of these and other compounds. None of these materials, however, has been able to yield an efficiency of conversion of heat energy into electrical energy in excess of about 10%. This, of course, renders the application and use of thermoelectric energy conversion as a standard technique for medium and large power units out of question for the time being. The reasons for this are either the inability of these materials to perform satisfactorily at high temperatures (low melting point or material becoming intrinsic) or a low figure of merit or a combination of both reasons.

I have found that this difficulty or shortcoming is overcome by the use of four metallic elements as the basic material for the manufacture of thermoelectric devices. These elements are: magnesium, silicon, germanium and tin. Each of the latter three forms a chemical compound with magnesium and then the resulting compounds are mixed together. Thus, the material is actually a solid solution or alloy composed of the following three intermetallic compounds:

magnesium stannide, $Mg_2Sn$,
magnesium germanide, $Mg_2Ge$ and
magnesium silicide, $Mg_2Si$ The resulting alloy is designated by the chemical formula:

$$Mg_2Si_xGe_ySn_{1-x-y}$$

where $x$ and $y$ represent the molecular proportion of each of $Mg_2Si$ and $Mg_2Ge$ in the solid solution, respectively. Each of $x$ and $y$ is greater than zero and less than unity, and their sum $(x + y)$ is again less than unity or less than one hundred percent. In other words, all three compounds are present. The properties of the alloy depend on the values of $x$ and $y$ or, in other words, on the atomic proportions or percentages of silicon, germanium and tin in the solid solution. If these proportions are equal, then the material has approximately the following properties:

Melting point _____°C__ 1000
Forbiddin energy band gap _____electron-volts__ 0.6

The term "melting point" mentioned above should be understood to designate the solidus temperature or, more precisely, the mid-temperature during transition or transformation of the material from the solid to the liquid phase. The above facts furnish clear evidence that the material can operate as a thermoelectric couple at a hot junction temperature of up to 800° C. and possibly 900° C. This, of course, gives a high Carnot efficiency according to the second law of thermodynamics.

In order to achieve optimum performance with this material as a thermoelectric energy converter, the following factors are determined:

(1) The relative proportions of silicon, germanium and tin in the solid solution
(2) The material is doped with the appropriate impurity and to the appropriate level.

As far as factor No. (1) is concerned, the best solution found is to use equal atomic percentages for silicon, germanium and tin. However, owing to factors related to the facility with which the material will be doped either positive or negative (p-type or n-type), the molecular proportions of $Mg_2Si$, $Mg_2Ge$ and $Mg_2Sn$ may be made unequal. This is necessary in order to achieve the optimum figure of merit with this material.

Factor No. (2) is related to the proper doping of the material to make it either electrically positive or negative. This is accomplished by providing for an excess of magnesium, silicon, germanium or tin in the solid solution above the quantity required by stoichiometry. An excess of magnesium effects negative doping (n-type material), whereas an excess of any one of the other three elements produces positive doping (p-type material). Any other doping impurities (elements or compounds) may be used if found to effect a more satisfactory doping. The important consideration is the level of doping. This should be adjusted in such a way as to give a carrier concentration of the order of about $10^{20}$ carriers per cm$^3$. This, of course, applies to both donors and acceptors. Doping the material to make it electrically negative (excess of electrons or donors) does not prove to be a problem owing to the high ratio of electron to hole mobilities. Doping the material to make it electrically positive (excess of holes or acceptors) is more easily and satisfactorily effected by reducing its forbidden energy band gap. This is accomplished by increasing the molecular proportion of magnesium stannide and, to a lesser extent, that of magnesium germanide in the alloy. In other words, each of the branches of the device has a different composition. This is necessary in order to maintain roughly the same figure of merit for both branches of the device. Nevertheless, the extent to which this increase in the proportion of $Mg_2Sn$ can be carried on is controlled by the limit of its solubility in the other two compounds and by the need to avoid any undue reduction of the temperature at which the material will begin melting. It is also restricted by the additional precaution to prevent the material from becoming intrinsic at relatively low temperatures.

Using the foregoing method the following examples show appropriate compositions of the material, representing several embodiments of the invention, that are properly doped, as disclosed in the specification, and then used in the fabrication of thermoelectric energy conversion devices:

(1) For both branches of the device (n-type and p-type materials)

$$Mg_2Si_{0.33}Ge_{0.33}Sn_{0.33}$$

(2) For the negative branch of the device (n-type material):

(a) $Mg_2Si_{0.4}Ge_{0.3}Sn_{0.3}$
(b) $Mg_2Si_{0.5}Ge_{0.3}Sn_{0.2}$ (3) For the postive branch of the device (p-type material):

(a) $Mg_2Si_{0.2}Ge_{0.4}Sn_{0.4}$
(b) $Mg_2Si_{0.3}Ge_{0.3}Sn_{0.4}$

The preferred composition ranges for the alloy or solid solution are from 20 to 50 molecular percent magnesium silicide, from 30 to 40 molecular percent magnesium germanide and from 20 to 40 molecular percent magnesium stannide.

In order to create a breakthrough in the technique and applications of direct thermoelectric energy conversion, a material must be found that yields a figure of merit at least ten times greater than that given the best thermoelectric materials used today. This will eventually give an efficiency of direct conversion of heat into electricity of about 40% (depending, of course, also on the temperature difference between hot and cold junctions). The present invention leads to the achievement of this goal.

The application of this invention in thermoelectric devices has the following basic advantages:

(1) A high ideal Carnot engine efficiency
(2) A high figure of merit, due to
   (a) a very low thermal conductivity
   (b) a high mobility of the electrons
   (c) a high electrical conductivity
   (d) a high thermoelectric power or Seebeck coefficient
(3) The possibility of control of the material composition through the alteration of the magnitudes of both $x$ and $y$, or at least one of them, lengthwise along both, or at least one, of the branches of the device between the hot and cold junctions. This variation in composition, in parallel with the temperature gradient prevailing in the device, ensures optimum performance
(4) A good mechanical strength due to the presence of $Mg_2Si$ in the material.

The starting elements needed for the preparation of this material (magnesium, silicon, germanium and tin) should be of the utmost possible purity. The intermetallic compounds required are preferably single crystals grown by a modified Bridgman technique or by any other method.

The purity of the starting elements, expressed as percentage by weight, should not be less than 99.99 and 99.999 for magnesium and tin, respectively, and should be substantially higher than the latter figure for both silicon and germanium. Magnesium, as received with the aforementioned purity, must be further purified, by distilling it under high vacuum, to attain a purity level comparable to those of the other three elements before using it for the formation of the intermetallic compounds. The latter are prepared by mixing together the respective elements in the appropriate stoichiometric amounts and then melting them to effect the necessary reactions (magnesium and silicon, magnesium and germanium, and magnesium and tin).

The starting elements, after being mixed together, are heated to temperatures about 50° C. above the melting points of the respective intermetallic compounds and held at these temperatures for about an hour to allow sufficient time for the necessary reactions to take place. Thus, magnesium stannide and magnesium germanide are obtained by heating the constituent elements to approximately 830° C. and 1165° C., respectively. Magnesium silicide forms an exception to the above in that the starting elements are heated to a temperature higher than 1410° C. to ensure complete melting of silicon first, and then the temperature may be allowed gradually to drop to 1150° C. and maintained at this level for a sufficient span of time to permit the reaction to be completed. Intense agitation of the melt and an excess of magnesium are necessary provisions or precautions for obtaining homogeneous and stoichiometric compounds.

The material is prepared either by mixing the starting elements themselves (magnesium, silicon, germanium and tin) in the proportions or amounts required and then melting them together or, preferably, by forming (reacting) each of the three intermetallic compounds (magnesium stannide, magnesium germanide and magnesium silicide) independently, mixing them in the required proportions and then melting them together. In either method, the doping agent or impurity, in the desired amount, may be added to the basic ingredients, which may be in powder or granulated form, and thoroughly mixed with them before the melting process is started. Alternatively, the doping impurity may be added during melting. If the first of the above two methods is adopted, then the ingredients should be heated to a temperature higher than 1410° C. to achieve complete melting of silicon first, and then allowed gradually to cool to a level which is a few degrees higher than the melting point of magnesium germanide which is the compound that has the highest melting temperature (1115° C.). The melt should be held at this temperature, which should be about 1125° C., for a sufficient time interval so that a complete mixing and alloying of the intermetallic compounds may occur. Afterwards, the material may be allowed to cool very gradually to ambient temperature and the single crystal solid solution may thus be obtained. In the event that the second method is used, the ingredients are heated to about 1125° C., as mentioned above, and held at this temperature for a span of time sufficient to ensure complete mixing and alloying of the intermetallic compounds. The process of crystal growth and the formation of the solid solution is started immediately following this stage. Intense agitation of the melt is an essential requirement to achieve homogeneity of the solid solution. An excess of magnesium, above the quantity required by stoichiometry, is provided and incorporated in the mixture to compensate for any excessive loss of this element by evaporation, that might occur, owing to its high volatility relative to that of the other three elements. For best results, the processes of melting and crystal growing are carried out in an inert or reducing gas atmosphere or in vacuum. Preparation in vacuum is preferred. Furthermore, excessive care is exercised to use crucibles or containers that will not contaminate or react with the basic constituents during melting and crystal growing.

Standard metallurgical techniques are employed during and after fabrication of the material to ensure that the resulting alloy or solid solution $Mg_2Si_xGe_ySn_{1-x-y}$ is homogeneous and stoichiometric. These techniques may comprise thorough agitation of the ingredients during the process of melting as well as the well known techniques of zone refining or zone melting.

The solid solution or alloy obtained should preferably be a single crystal grown by a modified Bridgman technique or by any other suitable method. If the Bridgman or temperature gradient freeze technique is selected, it will be necessary to observe and take the following precautions during growth of the single crystal:

(1) The solid-liquid interface should be carefully controlled. An arcuate interface which is concave into the liquid phase should be maintained. In other words, the the interface should lie in an arcuate plane and extend into the liquid phase at the isothermal surface between the solid and liquid phases
(2) A relatively uniform or linear temperature gradient should be maintained along the longitudinal axis of the crystal bearing container.

Through the fulfillment of the above two conditions, it will become possible to manufacture or obtain single crystals with relatively few dislocations and to materially reduce the possibility of crystal imperfections such as microscopic cracks and uneven crystal growth. The alloy or solid solution may still be polycrystalline. It should be polycrystalline. It should be pointed out that the Bridgman or temperature gradient freeze technique, mentioned above, is also known as the Bridgman-Stockbarger method.

The material, if desired, may also be prepared by a powder metallurgy technique. If this method is adopted, the intermetallic compounds are prepared first, then crushed and pulverized into a fine mesh powder. The dense material is obtained by thoroughly mixing the pulverized ingredients together and then hot pressing, or cold pressing and then sintering. The doping agent should preferably be added to the basic constituents during mixing.

The material, as explained earlier in the specification, must be doped with the appropriate impurities and to the appropriate level to attain optimum thermoelectric performance. Doping with copper, silver, cadmium or zinc effects a positive-type electrical conductivity or a p-type material. Aluminum, gallium, indium and gold may also be used as p-type impurity additives. Lithium or sodium may likewise be tried as doping impurities to generate an excess of acceptors or holes and thus effect a p-type material. Copper and silver are the preferred p-type dopants. In order to achieve a more drastic doping effect, one or more of the elements copper, silver, cadmium and zinc is mixed with at least another element, which may be selected from the group of elements comprising aluminum, gallium and indium, and the resulting mixture or alloy is used as the doping agent. Doping with any one of most of the elements constituting groups V–A, VI–A and VII–A in the Periodic Table of the elements produces a negative-type electrical conductivity or an n-type material. These elements include phosphorus, arsenic, antimony, bismuth, sulfur, selenium, tellurium, chlorine, bromine and iodine. They may be used either in their simple elemental forms or as compounds with other elements, preferably with magnesium. For example magnesium chloride ($MgCl_2$), magnesium iodide ($MgI_2$) and magnesium bromide ($MgBr_2$) may be used as n-type dopants. Alternatively, for better results, more than one doping element or compound may be used. This applies to both n-type and p-type dopants and becomes all the more important since the material is composed of four different elements having widely varying atomic radii and atomic weights. Any other doping agents (elements or compounds) may be selected if found to bring about a more effective doping.

The embodiments of the invention in which an exclusive property or privilege is claimed are defined as follows:

1. An alloy or solid solution of intermetallic compounds containing magnesium stannide $Mg_2Sn$, magnesium germanide $Mg_2Ge$, magnesium silicide $Mg_2Si$ in any proportions and optionally containing one or more additional doping materials.

2. An alloy or solid solution constituted by the following three intermetallic compounds:

magnesium stannide, $Mg_2Sn$,
magnesium germanide, $Mg_2Ge$ and
magnesium silicide, $Mg_2Si$, and defined by the chemical formula: $Mg_2Si_xGe_ySn_{1-x-y}$, where $x$ and $y$ represent the molecular proportion of each of $Mg_2Si$ and $Mg_2Ge$ in the alloy, respectively.

3. An alloy or solid solution according to claim 2, in which the molecular proportions of magnesium silicide, magnesium germanide and magnesium stannide are equal.

4. An alloy or solid solution according to claim 2, containing 20 to 50 mol percent of magnesium silicide, 30 to 40 mol percent of magnesium germanide and 20 to 40 mol percent of magnesium stannide.

5. An alloy or solid solution as defined in claim 4, in which the molecular proportion of magnesium silicide is greater than that of each of magnesium germanide and magnesium stannide.

6. An alloy or solid solution as claimed in claim 4, in which the molecular proportion of each of magnesium germanide and magnesium stannide is greater than that of magnesium silicide.

7. An alloy or solid solution according to claim 4, in which the molecular proportion of magnesium stannide is greater than that of each of magnesium germanide and magnesium silicide.

8. An alloy or solid solution as defined in claim 1, wherein the alloy or solid solution is a single crystal.

9. An alloy or solid solution according to claim 1, wherein the additional doping material or materials is selected so as to produce an n-type alloy.

10. An alloy or solid solution as defined in claim 9, wherein the doping material or materials is/are selected from the group comprising the elements of Groups V-A, VI-A, and VII-A of the Periodic Table of the elements and/or compounds thereof.

11. An alloy or solid solution as claimed in claim 10, wherein the compounds of the elements of Groups V-A, VI-A, and VII-A are magnesium compounds.

12. An alloy or solid solution according to claim 1, wherein the additional doping material or materials is selected so as to produce a p-type alloy.

13. An alloy or solid solution as defined in claim 12, wherein the doping material or materials is/are selected from the group consisting of lithium, sodium, copper, silver, cadmium, zinc, aluminum, gallium, indium and gold.

14. An alloy or solid solution according to claim 1, wherein the doping material or materials is/are selected from the group consisting of magnesium, silicon, germanium and tin.

15. A process for producing an alloy or solid solution according to claim 1, which comprises intimately mixing the four constituents: magnesium, silicon, germanium and tin in the appropriate stoichiometric amounts, preferably after granulation or pulverization, optionally adding a p-type or n-type doping agent, intimately mixing the doping agent with the basic constituents, heating the mixture to a temperature higher than 1410° C., cooling the molten ingredients to about 1125° C., maintaining them at this temperature to achieve a homogeneous mixture, and cooling the mixture to ambient temperature.

16. A process for producing an alloy or solid solution according to claim 1, which comprises separately preparing each of the three compounds: $Mg_2Sn$, $Mg_2Ge$ and $Mg_2Si$ by heating their ingredients to at least 830° C., 1165° C. and 1410° C., respectively, intimately mixing the three compounds in the required proportions, preferably after granulation or pulverization, optionally adding a p-type or n-type doping agent, intimately mixing the doping agent with the basic constituents, heating the mixture to about 1125° C., maintaining the molten ingredients at this temperature to achieve a homogeneous alloy, and cooling the alloy to ambient temperature.

17. A process according to claim 16 which comprises crushing and pulverizing the three intermetallic compounds into a fine powder, optionally introducing a p-type or n-type doping agent, intimately mixing the pulverized compounds and the doping agent, and subjecting the mixture to hot pressing, or to cold pressing and then sintering.

18. A process according to claim 15, wherein an excess of magnesium is added to compensate for the loss of this element by evaporation.

19. A process according to claim 15, wherein the operations are carried out in an inert or reducing gas atmosphere or in vacuum.

20. A process according to claim 15, wherein the molten ingredients are subjected to agitation.

21. A process according to claim 15, wherein at least part of the doping agent is added during melting.

22. A process according to claim 16, wherein an excess of magnesium is added to compensate for the loss of this element by evaporation.

23. A process according to claim 16, wherein the operations are carried out in an inert or reducing gas atmosphere or in vacuum.

24. A process according to claim 16, wherein the molten ingredients are subjected to agitation.

25. A process according to claim 16, wherein at least part of the doping agent is added during melting.

References Cited

UNITED STATES PATENTS

| | | | |
|---|---|---|---|
| 3,279,954 | 10/1966 | Cody et al. | 136—205 |
| 3,298,777 | 1/1967 | Brixner | 23—315 |
| 3,508,915 | 4/1970 | Paoli | 75—135 G |

L. DEWAYNE RUTLEDGE, Primary Examiner

E. L. WEISE, Assistant Examiner

U.S. Cl. X.R.

75—134 G, 134 S, 168 R, 175 R; 136—239

UNITED STATES PATENT OFFICE
CERTIFICATE OF CORRECTION

Patent No. 3,782,927                Dated January 1, 1974

Inventor(s) Michael C. Nicolaou

It is certified that error appears in the above-identified patent and that said Letters Patent are hereby corrected as shown below:

Column 2, line 5
　Delete the word "in" and insert "as" instead.
Column 4, line 19
　Delete "$M_2g$" and insert "$Mg_2$" instead.
Column 4, line 34
　Insert the word "by" between the word "given" and the word "the"
Column 4, line 38
　Insert the word "the" between the word "between" and the word "hot".
Column 6, lines 18 and 19
　Delete the sentence " It should be polycrystalline ".

Signed and Sealed this twenty-third Day of March 1976

[SEAL]

Attest:

RUTH C. MASON
Attesting Officer

C. MARSHALL DANN
Commissioner of Patents and Trademarks